INVENTOR.
Glenn T. McClure
BY
Attorney

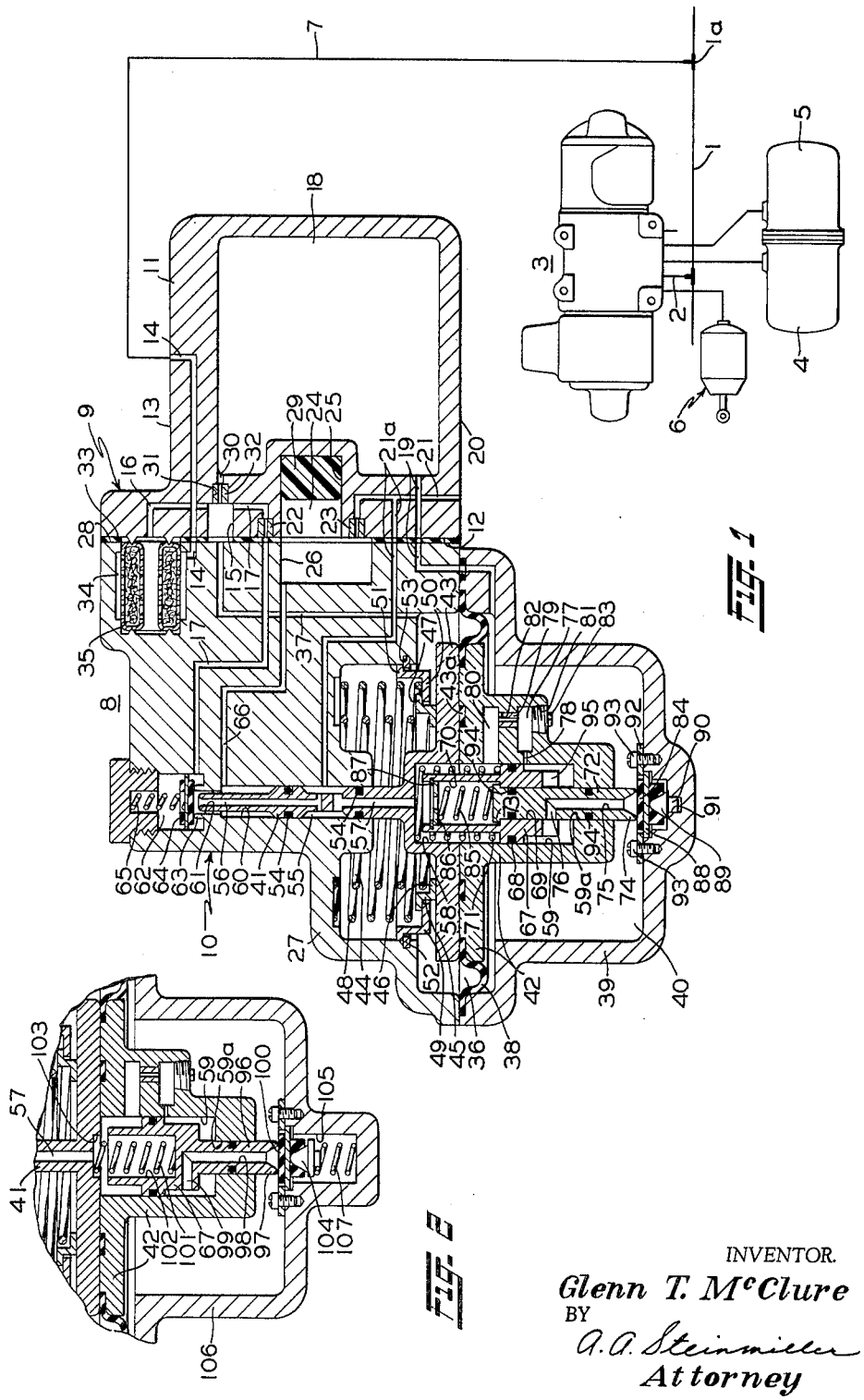

United States Patent Office 3,240,540
Patented Mar. 15, 1966

3,240,540
CONTINUAL QUICK SERVICE VALVE DEVICE
FOR FLUID PRESSURE BRAKE APPARATUS
Glenn T. McClure, McKeesport, Pa., assignor to Westinghouse Air Brake Company, Wilmerding, Pa., a corporation of Pennsylvania
Filed Mar. 25, 1964, Ser. No. 354,547
12 Claims. (Cl. 303—83)

This invention relates to fluid pressure brake apparatus for railway cars and the like, and more particularly to a novel type of "continual" quick service valve device which is operative repeatedly with each successive brake pipe pressure reduction over the entire service application range of brake pipe pressure reductions to effect "quick service" transmission through the brake pipe of a pressure reduction wave.

At the time the familiar AB air brake control valve device came into general use on American railroads over thirty years ago, the length of freight cars did not exceed sixty feet. Present-day freight cars that are conventionally equipped with the familiar AB air brake control valve device vary from approximately thirty to ninety feet in length. Since the brake pipe to which the AB air brake control valve device is connected extends from end to end of the car, it is apparent that the volume of the brake pipe on the longest cars being built today exceeds by at least fifty percent the volume of the brake pipe of older cars. Therefore, it is desirable to effect greater local quick service reductions in brake pressure than has been heretofore possible with the standard AB freight car brake equipment now in use on most American railroads in order to assure a higher rate of propagation of a brake pipe pressure reduction wave from the locomotive backward through the train and thereby effect a more nearly simultaneous initiation of a service application of brakes on all cars in a train.

Furthermore, the present standard freight car AB air brake control valve device is operable to provide a local quick service reduction in brake pipe pressure only in response to the initial reduction in brake pipe pressure effected by manual operation of the engineer's brake valve device located on the locomotive.

Under certain service conditions, for example, when a freight train having cars equipped with the conventional AB control valve device must descend a long and increasingly steep grade, it is necessary for the engineer to make an initial light reduction in brake pipe pressure and one or more subsequent heavier reductions in order to provide the proper degree of braking on the train as it descends the grade.

Therefore, it would be most desirable that each car in the train be provided, in addition to the conventional AB control valve device, with an improved quick service valve device for effecting "continual" (that is, interrupted but repeated) limited quick service reductions in brake pipe pressure.

In the copending application Serial No. 315,435 of Richard L. Wilson, filed October 11, 1963, now Patent No. 3,175,871, and assigned to the assignee of the present application, there is shown and described a quick service valve device which comprises a movable abutment subject on its opposite sides, respectively, to the pressure in the brake pipe and in a quick service chamber and operative in response to the reduction of pressure in the brake pipe to operate a pair of valves sequentially, the first of which effects a further reduction of pressure in the brake pipe active on one side of the movable abutment, and the other of which effects a reduction of pressure in the quick service chamber active on the opposite side of the movable abutment to restore the two valves to their original positions. Successive reductions of pressure in the brake pipe to increase the degree of a brake application causes repeated operations of the quick service valve device in response to these reductions in brake pipe pressure.

The amount of reduction in the pressure in the brake pipe by operation of the quick service valve device described in the above-mentioned copending application is not uniform for different car lengths and the consequent different brake pipe volumes on different length of cars.

It is desirable to provide a quick service valve device that will always provide on each successive operation the same reduction of pressure in the brake pipe regardless of the length of the car and the corresponding brake pipe volume on cars of different length, and therefore, it is the general object of this invention to provide a simple and inexpensive quick service valve device for accomplishing this purpose.

According to this invention, a novel quick service valve device is provided for use in combination with an AB brake control valve device, which novel quick service valve device is responsive to each successive service rate of reduction in brake pipe pressure to provide continually repeated quick service reductions in brake pipe pressure upon each and every engineer's brake valve device effected service reduction following an initial reduction.

More particularly, according to the present invention, a novel quick service valve device is provided which embodies therein a quick service valve means operatively connected to a diaphragm having two coaxial caged springs disposed in a chamber on one side thereof, and being subject to brake pipe pressure present in the chamber on the one side and to pressure of fluid in a quick service chamber on the opposite side, the quick service chamber having a restricted communication with the brake pipe. The quick service valve means is operative in response to a reduction in brake pipe pressure at a service rate in the chamber on the one side of the diaphragm to effect, at a restricted rate, a local quick service venting of fluid under pressure from the chamber on the one side of the diaphragm and the brake pipe to atmosphere or to a quick service volume. This venting continues until a sufficient differential of pressure is established on the diaphragm to deflect the diaphragm against the yielding resistance of the second caged spring to effect operation of a quick service chamber vent valve operatively connected to the diaphragm. Operation of this quick service chamber vent valve causes venting of fluid under pressure from the quick service chamber to atmosphere until the pressure therein is reduced to substantially that of the reduced brake pipe pressure present in the chamber on the one side of the diaphragm.

The novel quick service valve device constituting the present invention also includes a lost-motion connection between the diaphragm and the quick service chamber vent valve which enables the quick service chamber vent valve to effect the reduction of pressure in the quick service chamber a slight interval of time after the diaphragm has been deflected against the second caged spring and while the venting at a restricted rate of fluid under pressure from the brake pipe to atmosphere or to the quick service volume is occurring so that when the pressure in the quick service chamber and on the opposite side of the diaphragm has been reduced to a value slightly less than the reduced brake pipe pressure present in the chamber on the one side of the diaphragm, a differential of pressure will be established on the diaphragm to deflect it in the direction to first effect closing of the quick service valve means to terminate flow of fluid under pressure from the brake pipe to atmosphere or to the quick service volume and to subsequently effect closing of the quick service chamber vent valve to cut off flow of fluid under pressure from the quick service chamber to atmosphere.

In the accompanying drawings:

FIG. 1 is a diagrammatic view, partly in section, showing a brake control system for a railway freight car embodying the invention and comprising the well-known "AB" brake control valve device and a novel quick service valve device.

FIG. 2 is an elevational view, in section, of a portion of a novel quick service valve device embodying a modified form of a quick service chamber vent valve constructed in accordance with a second embodiment of the invention.

DESCRIPTION—FIG. 1

Figure 3:
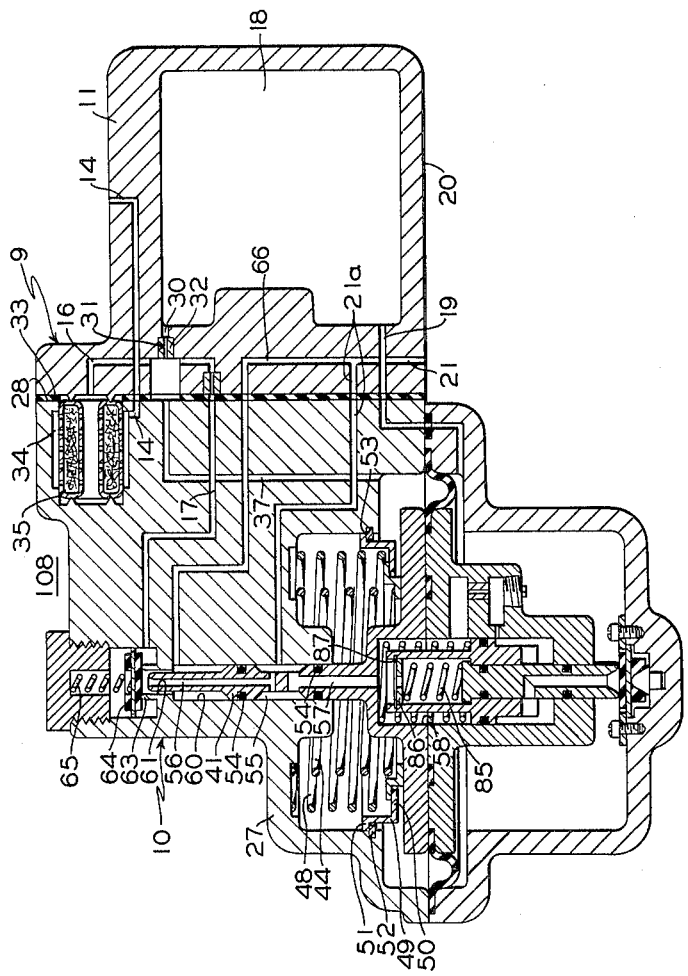
FIG. 3 is a diagrammatic view, in section, of a novel quick service valve device constructed in accordance with a third embodiment of the invention.

In FIG. 1, the fluid pressure brake equipment shown comprises a brake pipe 1, a first branch pipe 2, a brake control valve device 3, an auxiliary reservoir 4, an emergency reservoir 5, a brake cylinder device 6, a second branch pipe 7, and a quick service valve device 8.

The brake control valve device 3 may be of the direct release type, such as the well-known "AB" valve device which is fully described in United States Patent No. 2,031,213 (WAB Case 3447), issued February 18, 1936, to Clyde C. Farmer and assigned to the assignee of the present application.

In view of the above-mentioned patent, it is deemed unnecessary to show and describe in detail the brake control valve device 3 and the brake cylinder device 6. It will, of course, be understood that the brake control valve device 3 operates upon a service reduction in brake pipe pressure to supply fluid under pressure to effect a service application of the brakes, upon an emergency reduction in brake pipe pressure to effect an emergency application of the brakes, and upon an increase in brake pipe pressure to effect a full release of the brakes and the charging of the brake equipment. It will also be understood that the brake cylinder device 6 is effective to apply to the wheels of a freight a braking force proportional to the pressure of fluid supplied to said brake cylinder device by the brake control valve device 3.

The quick service valve device 8 comprises a pipe bracket portion 9 to which one end of the second branch pipe 7 is connected, the opposite end being connected to the side outlet of a pipe T 1a disposed in the brake pipe 1, and a quick service valve mechanism 10 secured to the pipe bracket portion 9 by any suitable means (not shown).

The pipe bracket portion 9 comprises a casing 11 that is provided on one side with a vertical bolting face 12 to which is secured by any suitable means (not shown) the quick service valve mechanism 10.

Extending from the vertical bolting face 12 of the casing 11 through the casing and opening at a flat surface 13 on the upper side of the casing, and at right angles to the bolting face 12 is a port and corresponding passageway 14 to which the one end of the second branch pipe 7 is connected. Also, opening at the surface of the vertical bolting face 12 and extending therefrom through the casing 11 and opening at the wall surface of a counterbore 15 extending into the casing 11 from the bolting face 12 are two other ports and passageways 16 and 17. Extending through the casing 11 and opening respectively at the vertical bolting face 12 and into a quick service chamber 18 formed in the casing 11 is a fourth passageway 19.

Furthermore, extending from the vertical bolting face 12 of the casing 11 through the casing and opening to atmosphere at a flat surface 20 on the lower side of the casing, and at right angles to the bolting face 12, is a fifth port and passageway 21 that has a branch 21a that opens at the surface of the vertical bolting face 12.

The passageways 17 and 21 in the casing 11 have respectively therein adjacent the bolting face 12 chokes 22 and 23 which respectively control the rate at which fluid under pressure is vented from the brake pipe 1 to a quick service volume 24 and the rate at which fluid under pressure is vented from the quick service volume 24 to atmosphere.

The quick service volume 24 is formed by the cooperative relationship of a counterbore 25 extending into the casing 11 from the bolting face 12 and a counterbore 26 of larger diameter extending into a casing 27 of the quick service valve mechanism 10 that is provided on one side thereof with a vertical bolting face 28 that corresponds to the bolting face 12 of the pipe bracket casing 11 in that opening at the surface of the bolting face 28 are ports corresponding to the ports 14, 17, 19, and 21a in the casing 11.

The capacity of the quick service volume 24 can be varied in accordance with the length of the brake pipe 1 on the car by the insertion of a plug 29, the thickness of which corresponds to the length of the brake pipe 1 on the particular car. The plug 29 may be constructed of any suitable material, such as, for example, plastic.

The counterbore 15 in the casing 11 is connected to the quick service chamber 18 by a coaxial bore 30 and counterbore 31, the latter having therein a choke 32 which controls the rate at which fluid under pressure can flow from the brake pipe 1 to the quick service chamber 18 to charge this chamber. This choke also controls the rate at which fluid under pressure can flow from the chamber 18 to brake pipe 1 and, therefore, must be sufficiently large to prevent an undesired quick service operation in response to slight variations in brake pipe pressure effected by erratic operation of a feed valve on the locomotive, of which feed valve controls the charging of the brake pipe 1 and the regulation of the pressure therein.

The casing 27 of the quick service valve mechanism 10 has opening at the surface of the bolting face 28 four ports corresponding to the ports 14, 17, 19 and 21a opening at the surface of the bolting face 12 on the casing 11, these ports being identically arranged therein and opening from corresponding passageways in the casing 27 so that when a gasket 33, provided with ports therein corresponding in number and arrangement to the ports opening at the respective surfaces of bolting faces 12 and 28, is placed between these two bolting faces and the casing 27 is rigidly secured to the casing 11 of the pipe bracket portion 9 by bolts or other suitable means (not shown), the passageways 14, 17, 19 and 21a in the casing 11 extend into corresponding passageways in the casing 27.

The casing 27 also has opening at the surface of the bolting face 28 a chamber 34 in which is contained a strainer device 35 which is inserted through the right-hand open end of the chamber 34 prior to securing the casing 27 to the casing 11. Such a strainer device is described and claimed in Patent No. 2,014,825 (WAB Case 3328), issued September 17, 1935, to Ellis E. Hewitt, which patent is assigned to the assignee of the present application. Briefly, however, the strainer device comprises two concentric perforated tubular retainers having the space therebetween packed with hair or any other material suitable for separating dirt, moisture or the like from a stream of fluid under pressure. The inner surface of the smaller of the two concentric retainers defines a passageway which is open to the port and passageway 16 in the casing 11. The passageway 14 that extends through the casings 11 and 27 opens into the chamber 34.

Also opening at the surface of the vertical bolting face 28 in alignment with the counterbore 15 in casing 11 and extending from said bolting face through the casing 27 and opening into a chamber 36 is a port and passageway 37, the chamber 36 being formed in the casing 27 above a flexible diaphragm 38 which is rigidly clamped around its periphery between the casing 27 and a cover 39 which is secured to the casing 27 by any suitable means (not shown). The diaphragm 38 and the cover 39 cooperate to form below the diaphragm a chamber 40 into which the passageway 19 opens.

The diaphragm 38 is operatively connected to a cylindrical spool-type valve 41 by means of a follower member 42 having a cup-shaped flange at one end that is clamped against a corresponding cup-shaped flange 43 formed on the lower end of the spool-type valve 41 by any suitable means (not shown), there being a seal in the form of a resilient annulus 43a constructed of some suitable material, such as, for example, rubber, interposed between the follower member 42 and flange 43.

To facilitate assembly of the quick service valve mechanism 10, prior to clamping the periphery of the diaphragm 38 between the casing 27 and cover 39, the casing 27 is inverted and a first spring 44 is placed within the chamber 36 after which a first spring seat 45 comprising a hollow sleeve having an inturned flange 46 at one end and an outturned flange 47 at the other is placed over the spring 44 so that the inturned flange 46 rests against the end of the spring 44.

Next, a second spring 48, the inside diameter of which is somewhat greater than the diameter of outturned flange 47, is positioned within the chamber 36 in concentric and coaxial relation with the first spring 44.

Thereafter, a second spring seat 49 comprising a hollow sleeve, the inside diameter of which is greater than the outside diameter of the second spring 48, is placed over the spring 48. This spring seat 49 has an inturned flange 50 at one end, the inside diameter of which is somewhat greater than the outside diameter of the sleeve comprising the spring seat 45 and somewhat less than the outside diameter of the outturned flange 47 on the spring seat 45. At its opposite end, spring seat 49 is provided with an outturned flange 51.

A force is now applied to the second spring seat 49 by any suitable means to compress the springs 44 and 48 and move the spring seats 45 and 49, it being understood that the inturned flange 50 on the spring seat 49 contacts the outturned flange 47 on the spring seat 45 toward the upper end of the chamber 36, as viewed in FIG. 1, until a retaining snap ring 52 can be inserted in a groove 53 formed in the casing 27. Upon removal of force from the spring seat 49, the spring 44 will be retained interposed between the casing 27 and the inturned flange 46 on spring seat 45 and the spring 48 will likewise be retained interposed between the casing 27 and the inturned flange 50 on the spring seat 49.

Prior to assembly of the quick service valve mechanism 10, a pair of identical O-ring seals 54 are placed in two spaced-apart peripheral annular grooves that are located adjacent the respective opposite ends of a peripheral annular groove 55 provided intermediate the ends of the spool-type valve 41.

The spool-type valve 41 has a first central counterbore 56, the bottom of which is connected by a cross-drilled port to the peripheral annular groove 55, and a second central counterbore 57, the bottom of which also is connected by a cross-drilled port to the peripheral annular groove 55, it being understood from FIG. 1 of the drawings that the counterbores 56 and 57 extend inward from the opposite ends of the spool-type valve 41, and that a counterbore 58 of larger diameter than the counterbore 57 is coaxial therewith and coextensive with a counterbore 59 formed in the follower member 42. The follower member 42 is provided with a bore 59a that is coaxial with the counterbore 59.

After the springs 44 and 48 and spring seats 45 and 49 are assembled and retained in the position in which they are shown in FIG. 1 of the drawings by the snap ring 52, the outer end of the spool-type valve 41 is inserted into a counterbore 60 formed in the casing 27 and opening into the chamber 36. Also formed in the casing 27 and coaxial with the counterbore 60 is a bore 61 that connects the counterbore 60 to a chamber 62 in the casing 27, there being an annular valve seat 63 formed at the upper end of the bore 61 against which a flat disc valve 64, disposed in the chamber 62, is normally biased by a spring 65 to close communication between the chamber 62 and a passageway 66 that extends through the casing 27 and opens at one end at the wall surface of the counterbore 60 adjacent the upper end thereof and opens at its other end into the quick service volume 24.

Also opening at the wall surface of the counterbore 60 and substantially below the location at which the passageway 66 opens at said wall surface is one end of the branch passageway 21a, this location being opposite the peripheral annular groove 55 while the spool-type valve 41 occupies the position in which it is shown in FIG. 1 of the drawings. Therefore, while the spool-type valve 41 occupies the position in which it is shown in FIG. 1, the quick service volume 24 has an unrestricted communication with atmosphere via passageway 66, counterbore 60, bore 61, counterbore 56, peripheral annular groove 55, branch passageway 21a, and passageway 21, and a restricted communication with atmosphere via choke 23 and passageway 21.

Slidably mounted in the counterbore 59 in the follower member 42 is a reset piston 67 that is provided with a peripheral annular groove in which is disposed an O-ring seal 68. The reset piston 67 is further provided with a bore 69 and a coaxial counterbore 70 and is biased toward the bottom of the counterbore 59 by a spring 71 interposed between the upper side of the piston 67 and the upper end of the counterbore 58.

Slidably mounted in the counterbore 69 is a valve stem 72 that has a collar 73 formed at its upper end. The valve stem 72 extends through the bore 59a in the follower member 42 and has a valve 74 formed at its lower end. A counterbore 75 extends upward from the bottom of the valve stem 72 and has its upper end open to the interior of the counterbore 59 in the follower member 42 by a port 76.

A chamber 77 formed in the follower member 42 is normally open to the lower side of the reset piston 67 via a port 78 and to the upper side of the reset piston via a choke 79 and a passageway 80 formed in the follower member 42. Therefore, while the reset piston 67 occupies the position in which it is shown in FIG. 1, the lower side of the piston is in communication with the upper side thereof via port 18, chamber 77, choke 79 and passageway 80. The choke 79 is assembled to the follower member 42 by inserting it through a screw-threaded bore 81 opening into the chamber 77 and then pressing it into a bore 82 connecting the chamber 77 to the passageway 80 after which a plug 83 is screw threaded into the screw-threaded bore 81.

The valve 74 on the lower end of valve stem 72 is normally biased into contact with a resilient valve seat 84 by a spring 85 that is interposed between the collar 73 at the upper end of the valve stem and an annular spring seat 86 that is retained in the counterbore 70 by a snap ring 87 that is inserted in a groove formed in the wall of counterbore 70.

The resilient valve seat 84 may be constructed of any suitable material, such as, for example, rubber, and has imbedded therein, by the process of moulding, a flat circular metallic plate 88, the outer edge of which extends beyond the resilient material that is bonded to the opposite sides thereof.

A substantially cone-shaped recess is formed in the resilient material bonded to the lower side of the flat circular plate 88 to provide for rockably mounting the valve seat 84 on a pivot pin 89 that has a shank 90 pressed into a bottom bore 91 formed in the cover 39. The valve seat 84 is retained on the pivot pin 89 by a flat annular plate 92 that overlies the outer edge of the plate 88 and is secured to the cover 39 by a pair of cap screws 93.

By rockably mounting the valve seat 84 on the pivot pin 89, the valve 74 will always seat on the valve seat 84 notwithstanding any misalignment of the valve or its valve seat.

In order to prevent leakage of fluid under pressure along the valve stem 72 between the periphery of the valve stem and the wall of the respective bores 69 and 59a, the valve stem 72 is provided with two peripheral annular grooves in each of which is disposed an O-ring seal 94.

OPERATION—FIG. 1

Initial charging

Let it be assumed that a railway freight car provided with the brake control valve device 3 and the quick service valve device 8, shown in FIG. 1 of the drawings, has been coupled into a train of cars, and that a handle of an engineer's brake valve device (not shown) located on the locomotive coupled to the head end of the train is in its "Release" position. Therefore, while the handle of the engineer's brake valve device is in its "Release" position, the engineer's brake valve device will effect the supply of fluid under pressure to the train brake pipe and therefore to the brake pipe 1 to charge the brake pipe to a preselected normal charged valve which, for example, may be seventy pounds per square inch.

Fluid under pressure supplied to the brake pipe 1 will cause the brake control valve device 3 to operate in the manner explained in detail in the above-mentioned Patent No. 2,031,213 to effect a release of the brakes on the car and charging of the auxiliary reservoir 4 and the emergency reservoir 5.

Fluid under pressure supplied to the brake pipe 1 will flow therefrom to the chamber 36 above the diaphragm 38 of the quick service valve device 8 via pipe T 1a, branch pipe 7, passageway 14, strainer device 35, passageway 16, counterbore 15, and passageway 37 to charge the chamber 36 to the hereinbefore-mentioned preselected normal charged value.

Fluid under pressure supplied to the counterbore 15, as explained above, will also flow therefrom to the quick service chamber 18 via the choke 32 and bore 30 to also charge the quick service chamber 18 at a rate controlled by the size of the choke 32 to the hereinbefore-mentioned preselected normal charged value.

Since the chamber 40 below the diaphragm 38 is connected to the quick service chamber 18 via the passageway 19, the chamber 40 also will be charged to the hereinbefore-mentioned preselected normal charged value.

With the chambers 36 and 40 on opposite sides of the diaphragm 38 charged to the same pressure, the springs 44 and 48 are rendered effective through the respective spring seats 45 and 49 and the cup-shaped flange 43 to move the spool-type valve 41 to the position in which it is shown in FIG. 1. When the spool-type valve 41 is moved to the position in which it is shown in FIG. 1, the spring 65 is rendered effective to seat the flat disc valve 64 on the annular valve seat 63 to close communication between the passageway 17 and the passageways 66 and 21a. While the flat disc valve 64 is seated on the annular valve seat 63, the chamber 62 is charged from the brake pipe 1 to the hereinbefore-mentioned preselected normal charged value via pipe T 1a, branch pipe 7, passageway 14, strainer device 35, passageway 16, counterbore 15, passageway 17, and choke 22 therein at a rate controlled by the size of the choke 22.

Also, while the flat disc valve 64 is seated on the annular valve seat 63, the quick service volume 24 has an unrestricted communication with atmosphere via passageway 66, counterbore 60, bore 61, counterbore 56 in the spool-type valve 41, peripheral annular groove 55 on the peripheral surface of the spool-type valve 41, branch passageway 21a, and passageway 21. The quick service volume 24 also has a restricted communication with atmosphere via choke 23 and passageway 21. Consequently, the quick service volume 24 will be at atmospheric pressure while the brake equipment on the car is charged and the brakes are released.

Full service application of brakes

Assume that the brake equipment shown in FIG. 1 of the drawings is the brake equipment on a freight car in a train of cars being hauled by a locomotive, and let it be supposed that the engineer desires to effect a full service brake application on the train.

To manually effect a full service application of brakes on the train, the engineer will move the handle of the engineer's brake valve device on the locomotive arcuately from its "Release" position to a "Full Service" position in a service zone.

When the handle of the engineer's brake valve device is moved to its "Full Service" position in the service zone, the brake valve device operates to vent fluid under pressure from the train brake pipe and therefore brake pipe 1 to atmosphere at a service rate until the pressure in the train brake pipe is reduced a corresponding degree.

As the pressure in the brake pipe 1 is reduced at a service rate, the brake control valve device 3 operates in the manner described in detail in the above-mentioned Patent No. 2,031,213 to effect an initial quick service reduction in brake pipe pressure and a full service brake application on the freight car on which the brake control valve device 3 is installed.

Also, as the pressure in the brake pipe 1 is reduced by flow therefrom to atmosphere via the train brake pipe and the engineer's brake valve device on the locomotive, fluid under pressure will flow at an unrestricted rate from the chamber 36 above the diaphragm 38 of the quick service valve device 8 to the brake pipe 1 via passageway 37, counterbore 15, passageway 16, strainer device 35, passageway 14 and branch pipe 7 so that the pressure in the chamber 36 is reduced at the same rate as the pressure in the train brake pipe is reduced.

At the same time, fluid under pressure will flow from the chamber 40 below the diaphragm 38 to the brake pipe 1 via passageway 19, quick service chamber 18, bore 30, choke 32, counterbore 15, passageway 16, strainer device 35, passageway 14, and branch pipe 7 at a restricted rate controlled by the size of the choke 32. Consequently, the pressure in the chamber 40 is reduced at a slower rate than the pressure in the chamber 36 and the higher pressure thus retained in the chamber 40 is effective to establish a differential of pressure on the diaphragm 38 which deflects the diaphragm 38 in an upward direction against the yielding resistance of spring 44 and thereby moves the spool-type valve 41 upward and causes the upper end thereof to first contact the bottom face of the flat disc valve 64 to close the unrestricted communication between the quick service volume 24 and atmosphere. As the spool-type valve 41 continues to move upward until the flange 43 contacts inturned flange 50 on spring seat 49, the flat disc valve 64 will be unseated from the annular valve seat 63. By unseating of the flat disc valve 64, fluid under pressure from the brake pipe is permitted to flow at a restricted rate to the quick service volume 24 via branch pipe 7, passageway 14, strainer device 35, passageway 16, counterbore 15, passageway 17, choke 22, chamber 62, thence past the now unseated flat disc valve 64 to the interior of bore 61 and counterbore 60 from which it flows through passageway 66 to the quick service volume 24. The size of the choke 22 is such as to prevent the pressure in the brake pipe 1 being reduced at an emergency rate. Consequently, an emergency brake application is avoided.

The fluid under pressure supplied from the brake pipe 1 to the quick service volume 24, as explained above, flows therefrom to atmosphere via choke 23 and passageway 21 at a rate determined by the size of the choke 23 until the supply of fluid under pressure to the quick service volume 24 is terminated by seating of the flat disc valve 64 on the annular valve seat 63, in a manner now to be explained. Thus, the quick service valve device 8 operates in response to a "Full Service" reduction in the pressure in the bake pipe 1 to quickly charge the quick service volume 24 from the brake pipe 1 to provide a transmission wave of quick service reduction in brake pipe pressure serially from car to car through the train.

The initial quick service reduction in brake pipe pressure effected by flow from the brake pipe 1 to the quick service volume 24 in response to unseating of the flat disc valve 64 is effective to further reduce the pressure in the chamber 36 above the diaphragm 38 since the chamber 36 is in communication with the quick service volume 24 at this time via passageway 37, counterbore 15, passageway 17, choke 22, chamber 62, bore 61, counterbore 60 and passageway 66. This further reduction in the pressure in the chamber 36 above the diaphragm 38 causes the higher pressure retained in the chamber 40 below the diaphragm to deflect this diaphragm upward against the yielding resistance of the spring 44 and also the spring 48, since, as previously stated, the cup-shaped flange 43 had already moved into contact with the inturned flange 50 on the spring seat 49.

As the diaphragm 38 is thus deflected upward, the follower member 42 is likewise moved upward. As the follower member 42 thus moves upward, the spring 71 is effective to expand and maintain the reset piston 67 in the position in which it is shown in FIG. 1 until the bottom of the counterbore 59 is moved into contact with the bottom of the reset piston 67, it being understood that the spring 85 is effective through collar 73 and stem 72 to maintain the valve 74 seated on valve seat 84 as the bottom of the counterbore 59 moves upward into contact with the reset piston 67. Since the reset piston 67 and the O-ring seal 68 carried thereby are thus maintained stationary as the follower member 42 moves upward, the port 78 will be moved to a position above the O-ring seal 68 so that communication is closed between the interior of the counterbore 59 and the chamber 77.

As the follower member 42 continues to be moved upward by the upward deflection of the diaphragm 38 subsequent to the lower end of the reset piston 67 contacting the bottom of the counterbore 59 in the follower member 42, the reset piston 67 and the valve stem 72 will be carried upward with the follower member 42 so that the valve 74 on the lower end of the valve stem 72 will be lifted upward from its valve seat 84.

When the valve 74 is lifted from its seat 84, fluid under pressure present in the chamber 40, and the quick service chamber 18 connected thereto by the passageway 19, flows past the unseated valve 74 and thence via the counterbore 75, port 76 in the valve stem 72, and a plurality of slots 95 formed in the bottom of the reset piston 67 to the interior of the counterbore 59 below the reset piston.

As hereinbefore stated, the O-ring seal 68 carried by the reset piston 67 is now below the port 78, thus closing communication between the interior of the counterbore 59 below the reset piston 67 and the chamber 77. Therefore, the fluid under pressure supplied from the quick service chamber 18 and chamber 40 below the diaphragm 38 to the interior of the counterbore 59 below the reset piston 67, at the time the valve 74 is lifted from its valve seat 84, will be effective to move the reset piston 67 upward against the yielding resistance of spring 71 until the upper end of the reset piston contacts the upper end of the counterbore 58 in the cup-shaped flange 43. As the reset piston 67 is thus moved to its uppermost position, the O-ring seal 68 carried thereby will be moved to a position above the port 78. Therefore, fluid under pressure will now flow from the quick service chamber 18 and chamber 40 below diaphragm 38 to atmosphere via counterbore 75 and port 76 in valve stem 72, slots 95, counterbore 59, port 78, chamber 77, choke 79, passageway 80, counterbores 58 and 57, peripheral annular groove 55, branch passageway 21a, and passageway 21 at a restricted rate determined by the size of the choke 79.

Fluid under pressure will thus be vented from the quick service chamber 18 and chamber 40 below the diaphragm 38 until the pressure in the chamber 40 is reduced sufficiently for the springs 44 and 48 to return their respective spirng seats 45 and 49, together with the cup-shaped flange 43, spool-type valve 41 and diaphragm 38, to the position in which they are shown in FIG. 1. As the spool-type valve 41 is thus moved downward, the spring 65 is rendered effective to seat flat disc valve 64. The fluid under pressure in the counterbore 59 below the reset piston 67 will be vented to atmosphere simultaneously with the fluid under pressure in the quick service chamber 18 and chamber 40. As fluid under pressure is thus vented from beneath the reset piston 67, the spring 71 is rendered effective to move the reset piston downward to the position shown in FIG. 1. As the reset piston 67 moves downward, the spring 85 is effective to maintain the collar 73 in contact with the bottom of the counterbore 70. Therefore, the valve stem 72 is moved downward with the reset piston 67 until the valve 74 formed on the lower end of the valve stem 72 is moved into contact with the resilient valve seat 84 to cut off further flow of fluid under pressure from the quick service chamber 18 and chamber 40 to atmosphere.

From the above, it is apparent that the diaphragm 38 is deflected upward in response to a reduction in brake pipe pressure present in the chamber 36 above the diaphragm to first unseat the flat disc valve 64 from its annular valve seat 63 to cause a quick service reduction in brake pipe pressure by flow of fluid under pressure from the brake pipe to the quick service volume 24 and thence to atmosphere, and then to effect lifting of the valve 74 from its seat 84 to cause the pressure in the quick service chamber 18 and chamber 40 below the diaphragm to be reduced the same amount, that is, to the same pressure, as the pressure in the chamber 36 is reduced by operation of the engineer's brake valve device on the locomotive and the unseating of the flat disc valve 64 to cause a local quick service venting of fluid under pressure from the brake pipe 1 to the quick service volume 24.

*Release of a full service application of brakes*

To effect a release of a "Full Service" application of brakes, the engineer will move the handle of the engineer's brake valve device on the locomotive from its "Full Service" position arcuately back to its "Release" position whereupon the engineer's brake valve device will effect the supply of fluid under pressure to the train brake pipe and therefore to the brake pipe 1 to charge the brake pipe to the hereinbefore-mentioned preselected normal charged valve.

The fluid under pressure thus supplied to the brake pipe 1 will cause the brake control valve device 3 to effect a release of the brakes as described under initial charging.

Fluid under pressure supplied to the brake pipe 1 will flow to the chambers 36 and 40 on opposite sides of the diaphragm 38 in the manner described under initial charging to charge these chambers and the quick service chamber 18 connected to the chamber 40 via the passageway 19 to the hereinbefore-mentioned preselected normal charged value. Consequently, the parts of the quick service valve device 8 will occupy the position in which they are shown in FIG. 1 and the quick service volume 24 will be at atmospheric pressure.

*Initial partial service application of brakes*

To manually effect an initial partial service application of brakes on the train, the engineer will move the handle of the engineer's brake valve device on the locomotive arcuately from its "Release" position into its service zone to a position corresponding to the degree of initial service brake application desired. When the handle of the engineer's brake valve device is moved into the service zone, the brake valve device operates to vent fluid under pressure from the brake pipe 1 to atmosphere until the pressure in the brake pipe 1 is reduced a corresponding degree.

As the pressure in the brake pipe 1 is reduced, the brake control valve device 3 operates in the manner described in the above-mentioned patent to effect an initial quick service reduction in brake pipe pressure and an initial partial service brake application on the freight car on which the brake control valve device 3 is installed, the degree of the partial service brake application corresponding to the degree of reduction of pressure effected in the brake pipe 1. The brake control valve device 3 then moves to a lap position.

Also, as the pressure in the brake pipe 1 is reduced by flow therefrom to atmosphere via the engineer's brake valve device on the locomotive, fluid under pressure will flow at an unrestricted rate from the chamber 36 above the diaphragm 38 of the quick service valve device 8 to the brake pipe 1 via passageway 37, counterbore 15, passageway 16, strainer device 35, passageway 14, and branch pipe 7 whereupon the quick service valve device 8 operates in the manner hereinbefore described in detail to first effect the supply of fluid under pressure from the brake pipe 1 to the quick service volume 24 to quickly charge the quick service volume 24 and thereby provide a transmission wave of quick service reduction in brake pipe pressure serially from car to car through the train.

The initial quick service reduction in brake pipe pressure effected by flow from the brake pipe 1 to the quick service volume 24 is effective to further reduce the pressure in the chamber 36 above the diaphragm 38, as hereinbefore explained. Therefore, the diaphragm 38 is deflected upward to cause the quick service valve mechanism 10 of the quick service valve device 8 to operate in the manner hereinbefore described in detail to unseat valve 74 and effect a corresponding reduction in the pressure in the chamber 40 and the quick service chamber 18 after which the valve 74 is reseated on its seat 84 and the parts of the quick service valve device 8 are returned to the position in which they are shown in FIG 1 of the drawings.

The fluid under pressure supplied to the quick service volume 24 by the initial operation of the quick service valve device 8 flows therefrom to atmosphere via the choke 23 and the passageway 21 at a rate controlled by the size of the choke 23 so that, subsequent to seating of the flat disc valve 64 on its annular valve seat 63 to cut off flow from the brake pipe 1 to the quick service volume 24, the pressure in the quick service volume 24 is reduced to atmospheric pressure after a period of time dependent on the size of the choke 23.

*Supplemental service application of brakes*

Let it be supposed that subsequent to effecting an initial partial service application of brakes on the train, the engineer desires to effect a supplemental service brake application to increase the degree of the service brake application on the train. To do so, he will move the handle of the engineer's brake valve device arcuately from the position it occupies in its service zone in a direction away from its "Release" position to another position in its service zone corresponding to the degree of service brake application now desired on the train. When the handle of the engineer's brake valve device is thus moved from one position in its service zone to another position in this zone farther away from its "Release" position, the brake valve device operates to again vent fluid under pressure from the brake pipe 1 until the pressure therein is reduced a corresponding degree.

As the pressure in the brake pipe 1 is thus further reduced, the brake control valve device 3 operates in the usual manner from its lap position to its service position to effect the supply of fluid under pressure from the auxiliary reservoir 4 to the brake cylinder device 6 to increase the degree of service brake application on the freight car on which the brake control valve device 3 is installed, the increase in the degree of the brake application corresponding to the reduction in pressure effected in the brake pipe 1 by movement of the handle of the engineer's brake valve device on the locomotive from one position in its service zone to another position in this zone farther from the "Release" position of the handle. The brake control valve device 3 will move back to its lap position when brake cylinder pressure has increased an amount corresponding to the reduction of pressure effected in the brake pipe.

As the pressure in the brake pipe 1 is further reduced by moving the handle of the engineer's brake valve device from one position in its service zone to another position in this zone, the pressure in the chamber 36 above the diaphragm 38 of the quick service valve device 8 is likewise reduced in the manner hereinbefore described, whereupon the quick service valve device 8 operates in response to the reduction in the pressure in the chamber 36 to first effect the supply of fluid under pressure from the brake pipe 1 to the quick service volume 24, which, as hereinbefore mentioned, is now at atmospheric pressure, to quickly charge the volume 24 and thereby provide another transmission wave of quick service reduction in brake pipe pressure serially from car to car through the train.

This second quick service reduction in brake pipe pressure effected by flow from the brake pipe 1 to the quick service volume 24 is effective to again further reduce the pressure in the chamber 36 above the diaphragm 38 of the quick service valve mechanism 10 whereupon the quick service valve mechanism 10 will operate in response to this reduction of pressure in the chamber 36, in the manner hereinbefore explained, to effect a corresponding reduction in the pressure in the chamber 40 and quick service chamber 18, after which the parts of the quick service valve device 8 return to the position in which they are shown in FIG. 1 and the fluid under pressure supplied to the quick service volume 24 is vented to atmosphere via the choke 23 and passageway 21 until the pressure in the quick service volume 24 is reduced to atmospheric pressure.

From the above, it is apparent that the quick service valve device 8 is operative in response to each successive engineer's brake valve device effected reduction in brake pipe pressure to effect the supply of fluid under pressure from the brake pipe 1 to the quick service volume 24 to cause continual and successive quick service reductions in brake pipe pressure as the pressure in the brake pipe 1 is reduced from its preselected normal charged value to a pressure corresponding to a full service brake application.

Subsequent to effecting a partial or full service brake application, such a brake application can always be released by the engineer moving the handle of the engineer's brake valve device arcuately from whatever position it occupies in its application zone back to its release position whereupon the engineer's brake valve device will effect the supply of fluid under pressure to the train brake pipe to charge the brake pipe 1 to the hereinbefore-mentioned preselected normal charged value, it, of course, being understood that each brake control valve device on the respective cars in the train operates in response to this charging of the train brake pipe to release the brakes on the car on which the respective brake control valve device is installed.

DESCRIPTION—FIG. 2

According to a second embodiment of the invention, a valve stem 96, as shown in FIG. 2, is formed integral with the reset piston 67 and replaces the separate valve stem 72 shown in FIG. 1. The integral valve stem 96 extends through the bore 59a in the follower member 42 and has a valve 97 formed at its lower end, which valve 97 corresponds to the valve 74 shown in FIG. 1. The valve stem 96 is provided with a counterbore 98 that extends upward from the bottom of the valve stem 96 and corresponds to the counterbore 75 in the valve stem 72, in that its upper end is open to the interior of the counterbore 59 in the follower member 42 by a port 99 that corresponds to the port 76 shown in FIG. 1.

The valve 98 on the lower end of the valve stem 96 is normally biased into contact with a resilient valve seat 100 that may be identical in construction to the valve seat 84, shown in FIG. 1, by a spring 101 that is interposed between the bottom of a counterbore 102 formed in the reset piston 67 and the bottom of a counterbore 103 formed in the spool-type valve 41, it being noted that the single spring 101 serves the same purpose as the two springs 71 and 85, shown in FIG. 1, in that it is normally effective to bias the reset piston 67 toward the bottom of the counterbore 59 in the follower member 42 and also to bias the valve 97 into contact with its valve seat 100.

Instead of being rockably mounted on a fixed or stationary pivot pin as is the valve seat 84 shown in FIG. 1, the valve seat 100 shown in FIG. 2 has a substantially cone-shaped recess on its lower side into which fits a corresponding nose formed on one side of a spring seat 104 between which and the bottom of a bottom bore 105, formed in a cover 106 corresponding to the cover 39 shown in FIG. 1, is interposed a spring 107 that is effective to yieldingly bias the valve seat 100 against the valve 97. All other parts of the structures comprising the two embodiments of the invention are identical.

Furthermore, the operation of the structures comprising the two embodiments of the invention is the same. Therefore, a detailed description of the operation of the embodiment of the invention shown in FIG. 2 is not deemed necessary to an understanding of this embodiment of the invention.

DESCRIPTION—FIG. 3

FIG. 3 of the drawings shows a third embodiment of a quick service valve device 108 comprising the invention. Quick service valve device 108 is identical in construction to quick service valve device 8 except the quick service volume 24 in the quick service valve device 8 is omitted from the quick service valve device 108.

The casing of the pipe bracket shown in FIG. 3 is not provided with a counterbore corresponding to the counterbore 25 shown in FIG. 1 for receiving a plug corresponding to the plug 29. Likewise, the casing of the quick service valve mechanism shown in FIG. 3 is not provided with a counterbore corresponding to the counterbore 26 shown in FIG. 1. Accordingly, by the omission of the quick service volume from the quick service valve device 108 shown in FIG. 3, no means are provided for, at the beginning of a quick service reduction in brake pipe pressure, venting fluid under pressure from the brake pipe at a very rapid rate, which rate diminishes until a quick service volume is filled, and subsequently venting fluid under pressure in the filled quick service volume to atmosphere at a slower rate. On the other hand, the quick service valve device 108 operates to vent fluid under pressure from the brake pipe directly to atmosphere at a constant rate throughout the duration of the quick service activity.

Since a quick service volume is omitted from the quick service valve device 108, the passageway in the quick service valve device 108 corresponding to the passageway 66 shown in FIG. 1 is extended through the two casings comprising this quick service valve device, so as to join with one end of the passageway corresponding to the passageway 21 shown in FIG. 1, which passageway is open at its opposite end to atmosphere as is the passageway 21.

Since the quick service valve dveices shown in FIGS. 1 and 3 are identical in construction, except as pointed out above, for convenience, corresponding parts of the two quick service valve devices are identified by the same reference numerals without additional decsription.

The operation of the quick service valve devices shown in FIGS. 1 and 3 is identical, it being understood that fluid under pressure is vented from the brake pipe directly to atmosphere by the quick service valve device 108 and not first to a quick service volume. Since the operation of the two quick service valve devices is otherwise identical, a detailed description of the operation of the quick service valve device shown in FIG. 3 is believed to be unnecessary.

Having now described the invention, what I claim as new and desire to secure by Letters Patent, is:

1. A quick service valve device for effecting repeated quick service reductions of pressure in the brake pipe of a railway vehicle brake system in response to successive reductions from the normal charge pressure in the brake pipe, said quick service valve device comprising:
  (a) a quick service chamber,
  (b) a movable abutment having a normal position when subject to substantially equal pressures in the brake pipe acting on one side and in the quick service chamber acting on the opposite side,
  (c) two coaxially arranged caged springs so disposed that the first yieldingly resists movement of said movable abutment in one direction out of said normal position a chosen amount and that the second yieldingly resists movement in said one direction beyond said chosen amount in response to reductions in the brake pipe with respect to that in said quick service chamber,
  (d) first valve means operative upon movement of said movable abutment in said one direction said chosen amount to effect venting of fluid under pressure active on said one side of said movable abutment and from the brake pipe to atmosphere, and
  (e) second valve means operative sequentially to said first valve means upon movement of said movable abutment in said one direction more than said chosen amount to effect venting of fluid under pressure active on said opposite side of said movable abutment and from the quick service chamber to atmosphere to cause said movable abutment to thereafter shift in the opposite direction to operate said first valve means to terminate said venting of fluid under pressure active on said one side of said movable abutment and from the brake pipe to atmosphere, whereby said movable abutment is rendered effective to subsequently operate said second valve means to terminate said venting of fluid under pressure active on said opposite side of said movable abutment and from the quick service chamber to atmosphere.

2. A quick service valve device for effecting repeated quick service reductions of pressure in the brake pipe of a railway vehicle brake system in response to successive reductions from the normal charge pressure in the brake pipe, said quick service valve device comprising:
  (a) a casing having formed therein a quick service chamber,
  (b) a movable abutment having a normal position when subject to substantially equal pressures in the brake pipe acting on one side and in the quick service chamber acting on the opposite side thereof,
  (c) a first caged spring supported by said casing,
  (d) a second caged spring supported by said casing,
  (e) said caged springs being coaxial to each other and to said movable abutment, said first caged spring being so disposed as to yieldingly resist movement of said movable abutment in one direction out of said normal position a chosen amount, and said first and said second caged springs jointly yieldingly resisting additional movement of said movable abutment in said one direction beyond said chosen amount in response to reductions of pressure in the brake pipe with respect to that in said quick service chamber, (f) first valve means operative upon movement of said movable abutment in said one direction said chosen amount to effect venting of fluid under pressure active on said one side of said movable abutment and from the brake pipe to atmosphere, and (g) second valve means operative sequentially to said first valve means upon movement of said movable abutment in said one direction more than said chosen amount to effect venting of fluid under pressure active on said opposite side of said movable abutment and from the quick service chamber to atmosphere to cause said movable abutment to thereafter shift in the opposite direction to operate said first valve means to terminate said venting of fluid under pressure active on said one side of said movable abutment and from the brake pipe to atmosphere, whereby said movable abutment is rendered effective to subsequently operate said second valve means to terminate said venting of fluid under pressure active on said opposite side of said movable abutment and from the quick service chamber to atmosphere.

3. A quick service valve device for effecting repeated quick service reductions of pressure in the brake pipe of a railway vehicle brake system in response to successive reductions from the normal charge pressure in the brake pipe, said quick service valve device comprising:

(a) a casing having formed therein a quick service chamber and a quick service volume, said quick service volume having a restricted communication with the atmosphere, (b) a movable abutment having a normal position when subject to substantially equal pressures in the brake pipe acting on one side and in the quick service chamber acting on the opposite side thereof, (c) a first caged spring supported by said casing, (d) a second caged spring supported by said casing, (e) said caged springs being coaxial to each other and to said movable abutment, said first caged spring being so disposed as to yieldingly resist movement of said movable abutment in one direction out of said normal position a chosen amount, and said first and said second caged springs jointly yieldingly resisting additional movement of said movable abutment in said one direction beyond said chosen amount in response to reductions of pressure in the brake pipe with respect to that in said quick service chamber, (f) first valve means operative upon movement of said movable abutment in said one direction said chosen amount to effect venting of fluid under pressure active on said one side of said movable abutment and from the brake pipe to the quick service volume in said casing, and (g) second valve means operative sequentially to said first valve means upon movement of said movable abutment in said one direction more than said chosen amount to effecting venting of fluid under pressure active on said opposite side of said movable abutment and from the quick service chamber to atmosphere to cause said movable abutment to thereafter shift in the opposite direction to operate said first valve means to terminate said venting of fluid under pressure active on said one side of said movable abutment and from the brake pipe to the quick service volume, whereby said movable abutment is rendered effective to subsequently operate said second valve means to terminate said venting of fluid under pressure active on said opposite side of said movable abutment and from the quick service chamber to the atmosphere.

4. A quick service valve device for a railway vehicle brake system, as claimed in claim 1, further characterized by a lost-motion connection between said movable abutment and said second valve means.

5. A quick service valve device for a railway vehicle brake system, as claimed in claim 1, further characterized by a lost-motion connection between said movable abutment and said second valve means comprising:

(a) a cup-shaped diaphragm follower secured to said movable abutment and having a bore and counterbore therein coaxial with said movable abutment, (b) a reset piston slidably mounted in the counterbore in said cup-shaped diaphragm follower and having a bore and counterbore therein coaxial with said movable abutment, (c) a stem slidably mounted in the respective coaxial bores in said cup-shaped diaphragm follower and reset piston, said stem being of sufficient length so as to be provided with a passageway extending inward from an exhaust valve formed on one end thereof that is disposed exteriorly of the bore in said follower and opening at one side of said reset piston, and with a collar on the opposite end that is disposed exteriorly of the bore in said reset piston, (d) a valve seat cooperating with the exhaust valve formed on the one end of said valve stem to control flow of fluid under pressure from the quick service chamber via the passageway in said stem to said one side of said reset piston, (e) passage means opening at one end at the wall surface of the counterbore in said cup-shaped diaphragm follower and at the opposite end to atmosphere, (f) first spring means interposed between said diaphragm follower and said reset piston to bias said reset piston in the direction to move it to a position to close communication between the one side of said reset piston and the one end of said passage means, and (g) second spring means interposed between said reset piston and the collar on the opposite end of said stem, whereby, upon movement of said movable abutment in said one direction, said first and second spring means cooperate respectively to cause said reset piston to close said passage means and to cause the valve on said stem to be maintained seated on said valve seat until said movable abutment has moved said chosen amount, subsequent further movement of said movable abutment in said one direction effecting unseating of the valve on said stem from said valve seat to open a communication between the quick service chamber and said one side of said reset piston whereupon said reset piston is moved against the yielding resistance of said first spring means to a position to open a communication between said one side thereof and atmosphere via said passage means to cause venting of fluid under pressure from the quick service chamber and said opposite side of said movable abutment to atmosphere to cause said movable abutment to thereafter shift in an opposite direction to terminate said venting.

6. A quick service valve device for a railway vehicle brake system, as claimed in claim 1, further characterized by a restricted communication via which fluid under pressure is supplied from the brake pipe to charge the quick service chamber in said casing.

7. A quick service valve device for a railway vehicle brake system, as claimed in claim 2, further characterized in that said first valve means comprises:

(a) an annular vent valve seat formed at one end of a bore in said casing, (b) passage means in said casing comprising two passageways, one of which opens at one end at the wall surface of the bore in said casing adjacent said annular vent valve seat and at the opposite end into the quick service volume in said casing and the other of which opens at one end at the wall surface of the bore in said casing more remote from said annular vent valve seat than that end of said one passageway that opens at the wall surface of said bore and at the opposite end to atmosphere, (c) a flat disc type valve, (d) a spring for biasing said flat disc type valve into contact with said annular vent valve seat, and (e) a cylindrical valve stem operatively connected at one end to said movable abutment and having thereon a pair of spaced-apart peripheral annular grooves for carrying therein a pair of O-ring seals whereby said cylindrical valve stem is sealingly and slidably mounted in the bore in said casing said cylindrical valve stem also having at its opposite end an annular exhaust valve seat formed at the end of a counterbore extending inward from said opposite end and opening at the surface of a peripheral annular groove formed on said cylindrical valve stem between said pair of spaced-apart peripheral annular grooves thereon which peripheral annular groove is always in communication with the one end of the other passageway in said casing so that the quick service volume in said casing has an unrestricted communication with atmosphere in bypass of its restricted communication with atmosphere in one position of said cylindrical valve stem in which the annular exhaust valve seat thereon is disposed below said flat disc type valve, initial movement of said movable abutment in said one direction being effective to first move the annular exhaust valve seat on said cylindrical valve stem into contact with the adjacent side of said flat disc type valve to close the unrestricted by-pass communication between the quick service volume and atmosphere and subsequent movement of said movable abutment in said one direction being effective to unseat said flat disc type valve from said annular vent valve seat to thereby establish a communication from said one side of said movable abutment and the brake pipe to the quick service volume in said casing via the one passageway of said passage means through which fluid under pressure flows from said one side of said movable abutment and the brake pipe until said second valve means effects venting of fluid under pressure active on said opposite side of said movable abutment and the quick service chamber in said casing for a time sufficient to cause the pressure therein to be reduced below the pressure on said one side to establish a differential of pressure on said movable abutment to move it in direction opposite said one direction to render said spring effective to seat said flat disc type valve on said annular vent valve seat to terminate venting of fluid under pressure active on said one side of said movable abutment and the brake pipe to the quick service volume in said casing via the one passageway of said passage means.

8. A quick service valve device for a railway vehicle brake system, as claimed in claim 1, further characterized in that said second valve means comprises:

(a) a cylindrical valve member having at one end a collar and at the opposite end an annular exhaust valve formed at the end of a passageway extending inward from said opposite end and opening at the surface of said cylindrical valve member intermediate the ends thereof, (b) a quick service chamber exhaust valve seat rockably mounted with respect to said casing at said opposite side of said movable abutment, (c) a member operably connected to said movable abutment for movement therewith, said member having formed therein a coaxial bore and counterbore, the end of which counterbore opposite said bore is open to atmosphere, and a restricted passageway, the opposite ends of which open one above the other at the wall surface of said counterbore, (d) a reset piston slidably mounted in the counterbore of said member and having therein a bore and a counterbore coaxial with the bore and counterbore in said member, said cylindrical valve member being mounted in said bores so that the collar thereon is disposed in the counterbore in said reset piston, (e) a first spring interposed between said reset piston and the collar on said cylindrical valve member for normally biasing the annular exhaust valve formed thereon into contact with said rockably mounted exhaust valve seat, and (f) a second spring interposed between said reset piston and said member for, in cooperation with said first spring, normally biasing said reset piston in the direction of the bottom of the counterbore in said member to a position in the counterbore in which the restricted passageway in said member establishes a restricted communication between the opposite sides of said reset piston whereby upon initial movement of said movable abutment in said one direction said first spring is effective to maintain the annular exhaust valve in seating contact with said exhaust valve seat and said second spring is effective to maintain said reset piston against movement so that the restricted passageway connecting the opposite sides of said reset piston is closed by movement of said member until said member is moved into contact with said reset piston whereupon said member, in response to additional movement of said movable abutment in said one direction is effective through the intermediary of said reset piston and the collar on the one end of said cylindrical valve member, to lift the annular exhaust valve at the opposite end out of seating contact with said exhaust valve seat to establish a communication from said opposite side of said movable abutment and the quick service chamber in said casing to the side of said reset piston adjacent the bottom of the counterbore in said member whereby fluid under pressure thus supplied to said side of said reset piston effects movement of said reset piston relative to said member to a position in which the restricted passageway in said member reestablishes communication between the opposite sides of said reset piston whereupon fluid under pressure active on said opposite side of said movable abutment and in the quick service chamber in said casing is vented to atmosphere until the pressure therein is less than that active on said one side of said movable abutment to cause said movable abutment to thereafter shift in said opposite direction.

9. A quick service valve device for a railway vehicle brake system, as claimed in claim 1, further characterized in that said second valve means comprises:

(a) a cylindrical valve member having at one end a piston and at the opposite end an annular exhaust valve formed at the end of a passageway extending inward from said opposite end and opening at the surface of said cylindrical valve member intermediate the ends thereof and below the piston, (b) a flat annular stop removably mounted on said casing at said opposite side of said movable abutment in coaxial alignment with the annular exhaust valve on said cylindrical valve member, (c) a flat disc type resilient exhaust valve seat disposed on the side of said flat annular stop opposite the annular exhaust valve on said cylindrical valve member and having a cone-shaped recess on the side thereof opposite the annular exhaust valve, (d) a spring seat having a cone-shaped nose disposed in the cone-shaped recess in said flat disc type resilient valve seat, (e) a spring interposed between said casing and said spring seat for normally biasing said flat disc type resilient valve seat against said flat annular stop, (f) a member operably connected to said movable abutment for movement therewith, said member having formed therein a coaxial bore and counterbore in which is respectively slidably mounted said cylindrical valve member and the piston thereon, the end of the counterbore opposite the bore being open to atmosphere, said member also having therein a restricted passageway the opposite ends of which open one above the other at the wall surface of said counterbore, and (g) a spring interposed between the piston on the one end of said cylindrical valve member and said member for normally biasing the piston on said cylindrical valve member in the direction of the bottom of the counterbore in said member to a position in the counterbore in which the restricted passageway in said member establishes a restricted communication between the opposite sides of the piston whereby, upon initial movement of said movable abutment in said one direction, said spring is effective to maintain the piston against movement and the annular exhaust valve in seating contact with said flat disc type resilient valve seat respectively so that the restricted passageway connecting the opposite sides of said reset piston is closed until said member is moved into contact with the piston whereupon said member, in response to additional movement of said movable abutment in said one direction, is effective, through the intermediary of the piston, to lift the annular exhaust valve at the opposite end of said cylindrical valve member out of seating contact with said flat disc type resilient exhaust valve seat to establish a communication from said opposite sides of said movable abutment and the quick service chamber in said casing to the side of the piston adjacent the bottom of the counterbore in said member whereby fluid under pressure thus supplied to said side of the piston effects movement of the piston relative to said member to a position in which the restricted passageway in said member reestablishes communication between the opposite sides of the piston whereupon fluid under pressure active on said opposite side of said movable abutment and the quick service chamber in said casing is vented to atmosphere until the pressure therein is less than that active on said one side of said movable abutment to cause said movable abutment to thereafter shift in said opposite direction.

10. A quick service valve device for a railway vehicle brake system, as claimed in claim 1, further characterized by choke means for controlling the rate at which fluid under pressure active on said one side of said movable abutment and in the brake pipe is vented by said first valve means to atmosphere.

11. A quick service valve device for a railway vehicle brake system, as claimed in claim 2, further characterized by choke means for controlling the rate at which fluid under pressure active on said one side of said movable abutment and in the brake pipe is vented by said first valve means to the quick service volume in said casing.

12. A quick service valve device for a railway vehicle brake system, as claimed in claim 1, further characterized in that the caged value of said second caged spring determines a uniform amount of pressure reduction that is effected in the brake pipe upon each successive operation of the quick service valve device.

No references cited.

EUGENE G. BOTZ, *Primary Examiner.*